United States Patent
Joshi et al.

(10) Patent No.: US 9,329,923 B2
(45) Date of Patent: May 3, 2016

(54) DIAGNOSTIC TESTING BASED ON INFORMATION HANDLING SYSTEM VARIABLES

(71) Applicants: Anand Prakash Joshi, Round Rock, TX (US); Bryan James Thornley, Burnet, TX (US); Claude Lano Cox, Austin, TX (US); Nikhil Manohar Vichare, Austin, TX (US); Vinod Makhija, Austin, TX (US)

(72) Inventors: Anand Prakash Joshi, Round Rock, TX (US); Bryan James Thornley, Burnet, TX (US); Claude Lano Cox, Austin, TX (US); Nikhil Manohar Vichare, Austin, TX (US); Vinod Makhija, Austin, TX (US)

(73) Assignee: Baker Botts L.L.P., Round Rock, TX (US)

( * ) Notice: Subject to any disclaimer, the term of this patent is extended or adjusted under 35 U.S.C. 154(b) by 189 days.

(21) Appl. No.: 14/278,992

(22) Filed: May 15, 2014

(65) Prior Publication Data
US 2015/0331734 A1 Nov. 19, 2015

(51) Int. Cl.
*G06F 11/00* (2006.01)
*G06F 11/07* (2006.01)
*G06F 11/34* (2006.01)
*G06F 11/30* (2006.01)

(52) U.S. Cl.
CPC .......... *G06F 11/079* (2013.01); *G06F 11/0787* (2013.01); *G06F 11/3006* (2013.01); *G06F 11/3409* (2013.01)

(58) Field of Classification Search
CPC ............................ G06F 11/079; G06F 11/3409
See application file for complete search history.

(56) References Cited

U.S. PATENT DOCUMENTS

| | | | | |
|---|---|---|---|---|
| 6,499,114 B1* | 12/2002 | Almstead | ........... | G05B 19/4184 399/26 |
| 6,587,960 B1* | 7/2003 | Barford | ............... | G06F 11/2257 714/6.13 |
| 8,024,618 B1* | 9/2011 | Margolis | ............. | G06F 11/0727 714/43 |
| 2006/0229777 A1* | 10/2006 | Hudson | ................. | G01M 15/05 701/31.4 |
| 2008/0209267 A1* | 8/2008 | Xu | ....................... | G06F 11/3688 714/25 |
| 2009/0089616 A1* | 4/2009 | Chen | ................... | G06F 11/2268 714/25 |
| 2010/0043004 A1* | 2/2010 | Tambi | ................. | G06F 11/3433 718/103 |
| 2013/0024730 A1* | 1/2013 | Kobayashi | ........... | G06F 11/079 714/37 |
| 2013/0086430 A1* | 4/2013 | Bauer | ................ | G06F 11/2242 714/39 |
| 2014/0068348 A1* | 3/2014 | Mondal | ................... | H04L 41/16 714/45 |
| 2014/0257828 A1* | 9/2014 | Thornley | ............... | G06F 11/00 705/2 |

OTHER PUBLICATIONS

Grevstad, "7 Facts About Intel's Smart Connect in Dell XPS 13", PCMag.com, 2 pages (Mar. 6, 2012).
U.S. Appl. No. 14/160,148; 22 pages (Jan. 21, 2014).

* cited by examiner

*Primary Examiner* — Yolanda L Wilson
(74) *Attorney, Agent, or Firm* — Baker Botts L.L.P.

(57) ABSTRACT

Methods and systems for performing diagnostic testing based on information handling system variables include receiving a first indication specifying diagnostic tests to be performed on an information handling system, receiving a second indication specifying diagnostic test conditions respectively associated with the diagnostic tests, receiving a third indication specifying health condition severity of the information handling system, and receiving a fourth indication specifying a user profile including user usage patterns. Based on the first indication, the second indication, the third indication, and the fourth indication, a schedule for executing diagnostic tests is generated.

20 Claims, 3 Drawing Sheets

DIAGNOSTIC TESTING BASED ON INFORMATION HANDLING SYSTEM VARIABLES

BACKGROUND

1. Field of the Disclosure

This disclosure relates generally to information handling systems and more particularly to diagnostic testing based on information handling system variables.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Various tools are known to track and monitor a health condition of an information handling system and notify a user when a service operation is indicated. In many instances, a first step of the service operation involves performing one or more diagnostic tests. For example, U.S. patent application Ser. No. 13/790,133 filed on Mar. 8, 2013, titled "SYSTEM AND METHOD FOR IN-SERVICE DIAGNOSTICS BASED ON HEALTH SIGNATURES", which is hereby incorporated by reference, discloses systems and methods for in-service diagnostic tests based on health signatures. However, even when users of an information handling system are notified of a health alert and/or are prompted to perform diagnostic tests, many users may ignore or delay such diagnostic actions, thereby potentially aggravating an underlying health condition. When diagnostic tests are performed immediately upon request, users may be faced with unexpected inconvenience and loss of productivity due to blockage of their information handling system. Furthermore, a full set of diagnostic tests, which provide the best accuracy and/or diagnostic information for resolving service issues, may take a significant amount of time to perform and may involve varying user settings and/or usage conditions of an information handling system.

SUMMARY

In one aspect, a disclosed method may include receiving a first indication specifying diagnostic tests to be performed on an information handling system. The first indication may be based on results of health condition monitoring of the information handling system. The method may include receiving a second indication specifying diagnostic test conditions respectively associated with the diagnostic tests specified by the first indication. The second indication may include operational states of the information handling system corresponding to the diagnostic tests. The method may further include receiving a third indication specifying health condition severity of the information handling system. The third indication may be based on results of the health condition monitoring. The method may also include receiving a fourth indication specifying a user profile. The fourth indication may include usage information for a user of the information handling system. Based on the first indication, the second indication, the third indication, and the fourth indication, the method may include generating a schedule for executing a first diagnostic test specified by the first indication.

Other disclosed aspects include article of manufacture comprising a non-transitory computer-readable medium storing instructions executable by a processor, and the information handling system.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
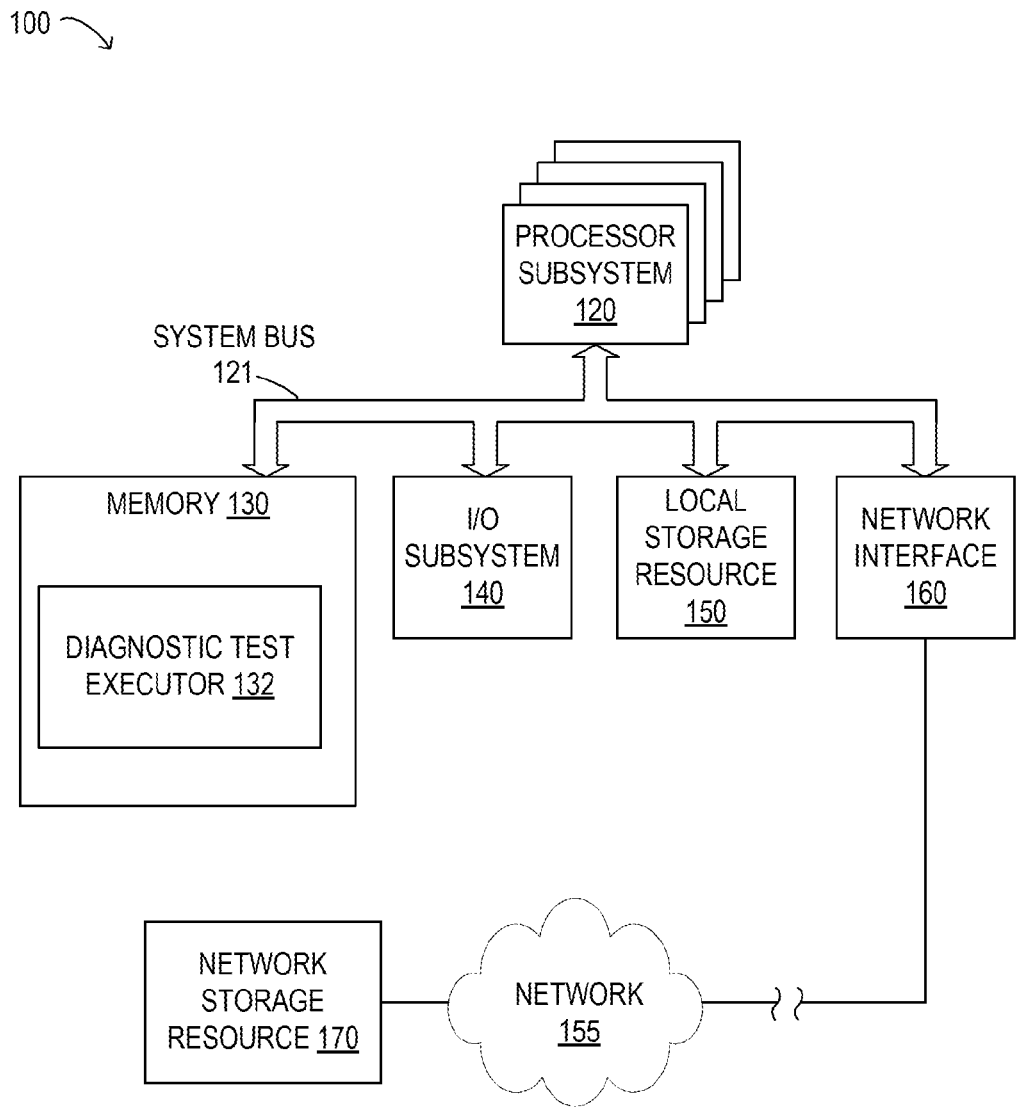
FIG. 1 is a block diagram of selected elements of an embodiment of an information handling system for implementing diagnostic testing based on system variables.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and/or communicating with, for example, hard drives, network circuitry, memory devices, I/O devices, and other peripheral devices. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

As noted previously, many users may ignore or delay diagnostic actions, such as diagnostic tests, even when a user is notified of a health alert and/or is prompted to perform a diagnostic test. Thus, while the diagnostic test may be indicated for the continued health of the user's information handling system, conventional methods of performing diagnostic tests may fail to provide convenient methods to accommodate actual user usage patterns. For example, U.S. patent application Ser. No. 14/160,148 filed on Jan. 21, 2014, titled "USER-PERSONALIZED WAKE POLICY BASED ON LEARNED USER BEHAVIOR", which is hereby incorporated by reference, discloses a user-personalized wake policy based on learned user behavior that may be adaptive to actual user activity and may account for variations in user usage patterns. As will be described in further detail, the inventors of the present disclosure have discovered a method for performing diagnostic testing based on information handling system variables that include health conditions, health condition severity, diagnostic test conditions, and user profiles storing user usage patterns.

Figure 2:
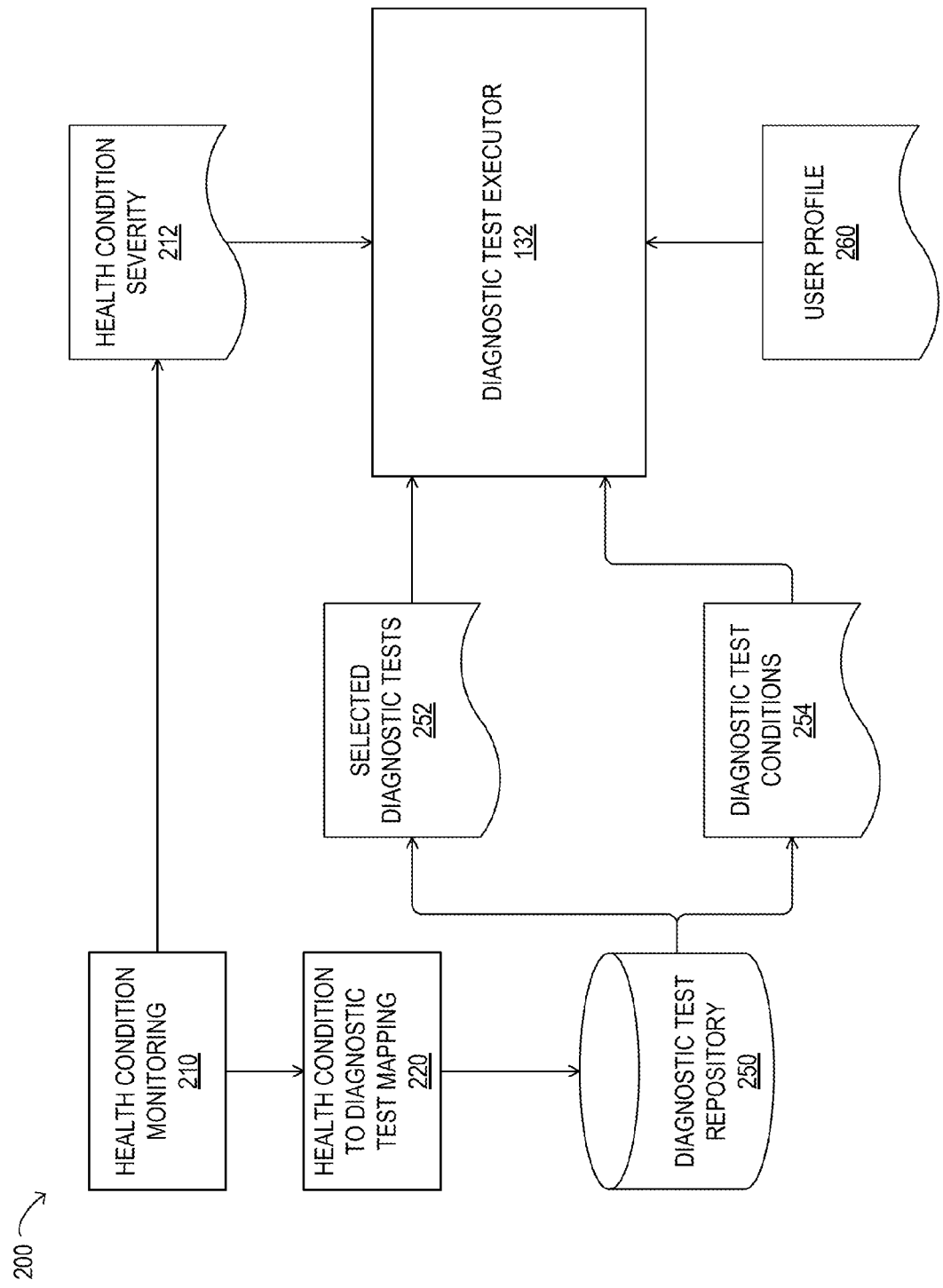
FIG. 2 is a block diagram of selected elements of an embodiment of a diagnostic test architecture for performing diagnostic testing based on system variables.
Figure 3:
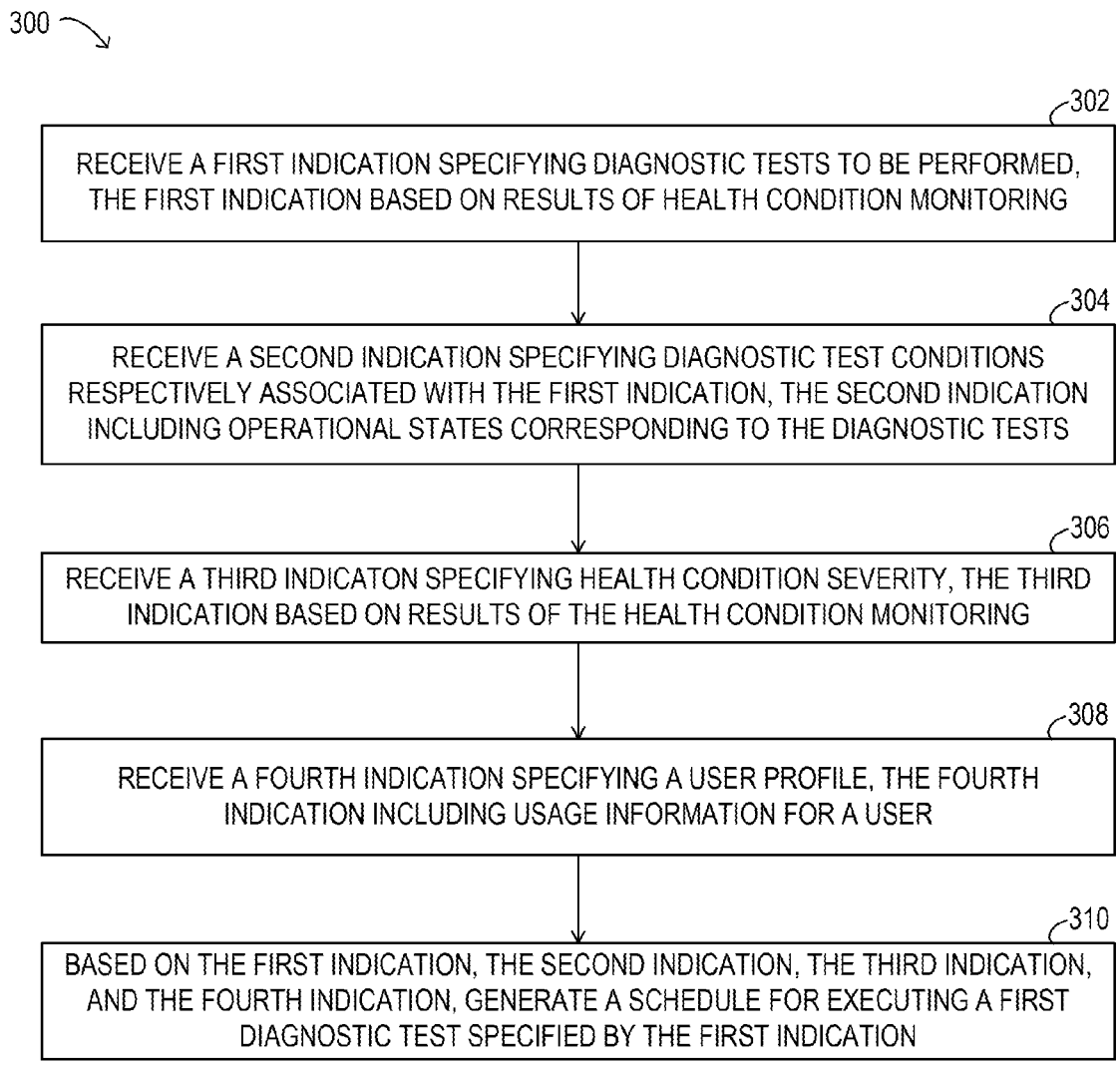
FIG. 3 is a flowchart depicting selected elements of an embodiment of a method for performing diagnostic testing based on system variables.

Particular embodiments are best understood by reference to FIGS. 1, 2, and 3 wherein like numbers are used to indicate like and corresponding parts.

Turning now to the drawings, FIG. 1 illustrates a block diagram depicting selected elements of an embodiment of information handling system 100. As shown, information handling system 100 may represent various types of information handling systems, including portable systems and/or fixed systems. Portable systems may include personal computers, laptops, notebooks, hand-held systems, tablets, laptop-tablet systems, among others. Fixed systems may include personal computers, desktop systems, tower systems, servers, among various types. Also shown with information handling system 100 are external or remote elements, namely, network 155 and network storage resource 170.

As shown in FIG. 1, components of information handling system 100 may include, but are not limited to, processor subsystem 120, which may comprise one or more processors, and system bus 121 that communicatively couples various system components to processor subsystem 120 including, for example, memory subsystem 130, I/O subsystem 140, local storage resource 150, and network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network 155. Network interface 160 may enable information handling system 100 to communicate over network 155 using a suitable transmission protocol and/or standard, including, but not limited to, transmission protocols and/or standards enumerated below with respect to the discussion of network 155. In some embodiments, network interface 160 may be communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 155 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof. In certain embodiments, information handling system 100 and/or network 155 may be included in a rack domain.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of physical hardware 102). In the same or alternative embodiments, processor subsystem 120 may interpret and/or execute program instructions and/or process data stored remotely (e.g., in a network storage resource).

Also in FIG. 1, memory subsystem 130 may comprise a system, device, or apparatus operable to retain and/or retrieve program instructions and/or data for a period of time (e.g., computer-readable media). As shown in the example embodiment of FIG. 1, memory subsystem 130 stores diagnostic test executor 132, which may represent instructions executable by processor subsystem 120 to implement the methods described herein. It is noted that in different embodiments, diagnostic test executor 132 may be stored at network storage resource 170 and may be accessed by processor subsystem 120 via network 155 Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to an associated information handling system, such as information handling system 100, is powered down. It is noted that in certain embodiments, diagnostic test executor 132 may be executed by an embedded controller (not shown in FIG. 1) having a secondary processor to processor subsystem 120, and which may be associated with the BIOS, such as for performing certain control operations.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. For example, local storage resource 150 may store executable code in the form of program files that may be loaded into memory subsystem 130 for execution, such as diagnostic test executor 132. In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In certain embodiments, I/O subsystem 140 may comprise a touch panel and/or a display adapter. The touch panel (not shown) may include circuitry for enabling touch functionality in conjunction with a display (not shown) that is driven by display adapter (not shown).

As will be described in further detail, information handling system 100 may implement diagnostic testing based on system variables. Specifically, diagnostic test executor 132 may represent a service, an application, and/or other forms of executable code for performing diagnostic testing based on system variables. The system variables may include selected diagnostic tests that are identified and/or selected based on health condition monitoring of information handling system 100. The system variables may include diagnostic test conditions, which specify certain operational states of information handling system 100 that are respectively associated with particular selected diagnostic tests. The system variables may include health condition severity respectively associated with a health condition of information handling system 100. The system variables may further include a user profile, which may include usage patterns of a user of information handling system 100.

In this manner, the methods and systems described herein may provide diagnostic testing based on system variables that is customized both to the actual health condition of information handling system 100 and to convenience aspects of a user of information handling system 100. The methods and systems described herein may thus provide more comprehensive and accurate diagnostic testing, but also diagnostic testing that is more likely to actually be performed by the user, than conventional methods of diagnostic testing of information handling systems.

Turning now to FIG. 2, a block diagram of selected elements of an embodiment of diagnostic test architecture 200 for performing diagnostic tests based on system variables, as described herein, is illustrated. In diagnostic test architecture 200, diagnostic test executor 132 may be executed on information handling system 100 (see FIG. 1) for scheduling and executing certain diagnostic tests, as will now be described in further detail.

In diagnostic test architecture 200 of FIG. 2, health condition monitoring 210 may represent monitoring functionality that may be orchestrated locally on information handling system 100 and/or remotely, for example, via network 155 (e.g. health telemetry). Accordingly, in particular embodiments, results of health condition monitoring 210 may be stored locally and/or remotely. Health condition monitoring 210 may rely on information that is provided by other resources having access to information handling system 100. For example, health condition monitoring 210 may access log files generated by an operating system (OS—not shown) executing on information handling system 100. The OS log files may include certain health information about information handling system 100. In given embodiments, health condition monitoring 210 may access event logs posted by a basic input/output system (BIOS) that executes on information handling system 100 upon booting to provide access to various hardware components. The BIOS events may indicate a 'fault' (as used herein, a 'fault' shall refer to a failure, a defect, or malfunction of a hardware component included in an information handling system) of a particular hardware component, which may also be observed as an 'error' (as used herein, an 'error' shall refer to a failure, a bug, or a malfunction of a software component, which may occur with or without a fault) in a related software component. In certain embodiments, health condition monitoring 210 may be performed, at least in part, using Dell Client System Analyzer (DCSA).

In FIG. 2, results of health condition monitoring 210 may be processed by health condition to diagnostic test mapping 220, for example, as disclosed in U.S. patent application Ser. No. 13/790,033, to identify specific diagnostic tests that are indicated for execution on information handling system 100. Diagnostic test repository 250 may represent a central store for diagnostic tests and/or diagnostic test information. In various embodiments, diagnostic test repository 250 may be a database that is network-accessible. It is noted that diagnostic test repository 250 may store various types of diagnostic tests from different sources. The diagnostic tests stored in (or accessible by) diagnostic test repository 250 may include Dell Enhanced Pre-Boot System Diagnostics (ePSA), BIOS diagnostic tests, diagnostic tests from online sources, and OS diagnostic tests, among others. In certain embodiments, diagnostic test repository 250 may store diagnostic tests developed by third-parties, such as component vendors, for information handling system 100. In some embodiments, diagnostic test repository 250 may include a diagnostic library of diagnostic tests that include plug-ins that perform diagnostic testing on a system with minimal or no user input. Based on the inputs provided by health condition to diagnostic test mapping 220, diagnostic test repository 250 may generate selected diagnostic tests 252 as well as diagnostic test conditions 254.

As shown in FIG. 2, diagnostic test conditions 254 may include information describing operational states of information handling system 100 that correspond to selected diagnostic tests 252. In some instances, diagnostic test conditions 254 may represent required conditions for performing a given diagnostic test, which may be internally verified by information handling system 100. For example, diagnostic test conditions 254 may specify an execution environment and/or an operating system for a given diagnostic test—whether under a particular OS or by a BIOS. For example, diagnostic test conditions 254 may specify a power source supplied to information handling system 100—whether line power or battery power. For example, diagnostic test conditions 254 may specify a standby mode of information handling system 100—whether normal operation, sleep mode, standby mode, stealth mode (no fans, lights), etc. When information handling system 100 is a laptop computer, diagnostic test conditions 254 may specify whether a cover (i.e. lid) of information handling system 100 is closed or open. For example, diagnostic test conditions 254 may specify an audio output by information handling system 100—whether audio is activated or deactivated. For example, diagnostic test conditions 254 may specify a screen display of information handling system 100—whether a screen display is activated or deactivated. For example, diagnostic test conditions 254 may specify a network connection of information handling system 100—whether the network connection is activated or deactivated. For example, diagnostic test conditions 254 may specify user operation of information handling system 100—whether user-operated or idle (i.e., powered on but no user input or actions). It is noted that various combinations of the operational states, as well as other operational states, may be included in diagnostic test conditions 254 in various embodiments.

Also in FIG. 2, health condition monitoring 210 may generate health condition severity 212, which may include information about a severity of an adverse health condition detected by health condition monitoring 210. The adverse health condition may be a fault (hardware and software) or an error (software only). For example, health condition severity 212 may include information specifying a high severity, which may indicate an imminent failure of the information handling system, a data loss from the information handling system, and/or a security breach of the information handling system, among other information. For example, health condition severity 212 may include information specifying a low severity, which may indicate a spurious fault detected in the information handling system, an unconfirmed error detected in the information handling system, a first time error detected in the information handling system, and/or a low-impact error detected in the information handling system, among other information. For example, health condition severity 212 may include information specifying an intermittent severity, which may indicate an unconfirmed fault indicating further diagnostic tests, and/or a reboot error indicating a reboot of the information handling system.

Finally, in FIG. 2, user profile 260 may include usage patterns of a user of information handling system 100. For example, user profile 260 may include information specifying a sleep/wake pattern for the user, as described in U.S. patent application Ser. No. 14/160,148. For example, user profile 260 may include information specifying a power management setting for information handling system 100—whether in power savings mode, hard disk powered off, etc. For example, user profile 260 may include information specifying a battery charging pattern for information handling system 100—whether charged, charging, sufficient charge, etc. For example, user profile 260 may include information specifying a network usage pattern for the user. For example, user profile 260 may include information specifying a docked state of the information handling system—whether docked or undocked. In various embodiments, certain information included in user profile 260 may be adaptively learned and/or refined over time. To the extent that user-specific information is available, certain information included in user profile 260 may be obtained from external sources, such as health condition monitoring 210 and/or other sources of logged system information, such as power event logs from the OS or BIOS.

In operation, at least certain portions of diagnostic test architecture 200 in FIG. 2 may be executed on information handling system 100. Based on selected diagnostic tests 252, diagnostic test conditions 254, health condition severity 212, and user profile 260, diagnostic text executor 132 may schedule execution of one or more diagnostic tests, for example, by generating a schedule that is then executed. The schedule may specify when to execute a particular diagnostic test. For example, the schedule may specify immediate execution. The schedule may specify execution when the user operates the information handling system and/or execution when the information handling system is idle. The schedule may specify execution upon reboot of the information handling system. In some embodiments, the schedule may specify execution according to a service level agreement for the user. In various embodiments, the schedule may specify one-time execution and/or multiple-time execution (e.g., repeated, periodically, at given times, etc.). It is noted that certain information included in diagnostic test conditions 254 and/or user profile 260 may be defined as default values, or may be defined for a given level of service, such as specified by a service level agreement.

As diagnostic text executor 132 executes selected diagnostic tests 252, test results for individual ones of selected diagnostic tests 252 may be recorded. The test results may be recorded locally at information handling system 100 and/or remotely at a network resource. In certain embodiments, data on health condition sensed by health condition monitoring 210 and/or test results may be sent to a service provider associated with information handling system 100. The service provider may be enabled to analyze and further process this information, which may lead to further refinement of diagnostic test conditions 254 and/or user profile 260.

In one example, a system crash may be observed by health condition monitoring 210 and may be assigned a value for health condition severity 212 based on a particular error code and/or a number of occurrences of the same event. Then, health condition to diagnostic test mapping 220 may map the observed condition to an appropriate diagnostic test, for which diagnostic test conditions 254 indicate that the diagnostic test may be executed while information handling system 100 is unattended and is powered from a line source. Diagnostic text executor 132 may then determine from user profile 260 at which times information handling system 100 operates on line power. According to these variables, diagnostic text executor 132 may schedule the diagnostic test for execution on information handling system 100 at a particular time. Then, when the execution time arrives, diagnostic text executor 132 may wake the system from a sleep mode (or reboot, etc. as indicated by diagnostic test conditions 254) and execute the diagnostic test. The test results may be stored and/or may be reported to another entity, such as health condition monitoring 210, after which information handling system 100 may be placed back in the sleep mode or another defined state, as indicated by diagnostic test conditions 254.

Referring now to FIG. 3, a block diagram of selected elements of an embodiment of method 300 for performing diagnostic tests using system variables is depicted in flowchart form. Method 204 may represent a functionality performed by diagnostic text executor 132 on information handling system 100, as described herein (see FIGS. 1 and 2). It is noted that certain operations described in method 300 may be optional or may be rearranged in different embodiments.

In FIG. 3, method 300 may begin by receiving (operation 302) a first indication specifying diagnostic tests to be performed, the first indication based on results of health condition monitoring. A second indication may be received (operation 304) specifying diagnostic test conditions respectively associated with the first indication, the second indication including operational states corresponding to the diagnostic tests. A third indication may be received (operation 306)

specifying health condition severity, the third indication based on results of the health condition monitoring. A fourth indication may be received (operation 308) specifying a user profile, the fourth indication including usage information for a user. Based on the first indication, the second indication, the third indication, and the fourth indication, a schedule may be generated (operation 310) for executing a first diagnostic test specified by the first indication.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method, comprising:
   receiving a first indication specifying diagnostic tests to be performed on an information handling system, wherein the first indication is based on results of health condition monitoring of the information handling system;
   receiving a second indication specifying diagnostic test conditions respectively associated with the diagnostic tests specified by the first indication, wherein the second indication includes operational states of the information handling system corresponding to the diagnostic tests;
   receiving a third indication specifying health condition severity of the information handling system, wherein the third indication is based on results of the health condition monitoring;
   receiving a fourth indication specifying a user profile, wherein the fourth indication includes usage information for a user of the information handling system; and
   based on the first indication, the second indication, the third indication, and the fourth indication, generating a schedule for executing a first diagnostic test specified by the first indication.

2. The method of claim 1, further comprising:
   executing the schedule, including:
      performing the first diagnostic test on the information handling system; and
      recording the results of the first diagnostic test.

3. The method of claim 1, wherein the schedule is for executing a plurality of diagnostic tests specified by the first indication, the plurality of diagnostic tests including the first diagnostic test.

4. The method of claim 1, wherein the second indication includes operational states of the information handling system selected from at least one of:
   an operating system executing on the information handling system;
   a power source supplied to the information handling system;
   a standby mode of the information handling system;
   an audio output by the information handling system;
   a screen display of the information handling system;
   a network connection of the information handling system; and
   user operation of the information handling system.

5. The method of claim 1, wherein the third indication specifies health condition severity of the information handling system selected from at least one of:
   a high severity, indicating at least one of: imminent failure of the information handling system, a data loss from the information handling system, and a security breach of the information handling system;
   a low severity, indicating at least one of: a spurious fault detected in the information handling system, an unconfirmed error detected in the information handling system, a first time error detected in the information handling system, and a low-impact error detected in the information handling system; and
   an intermittent severity, indicating at least one of: an unconfirmed fault indicating further diagnostic tests, and a reboot error indicating a reboot of the information handling system.

6. The method of claim 1, wherein the fourth indication includes usage information selected from at least one of:
   a sleep/wake pattern for the user;
   a power management setting for the information handling system;
   a battery charging pattern for the information handling system;
   a network usage pattern for the user; and
   a docked state of the information handling system.

7. The method of claim 1, wherein the schedule specifies when to execute the first diagnostic test according to at least one of:
   immediate execution;
   execution when the user operates the information handling system;
   execution when the information handling system is idle;
   execution upon reboot of the information handling system;
   execution according to a service level agreement for the user; and
   one-time execution; and
   multiple-time execution.

8. An article of manufacture comprising a non-transitory computer-readable medium storing instructions, that, when executed by a processor, cause the processor to:
   receive a first indication specifying diagnostic tests to be performed on an information handling system, wherein the first indication is based on results of health condition monitoring of the information handling system;
   receive a second indication specifying diagnostic test conditions respectively associated with the diagnostic tests specified by the first indication, wherein the second indication includes operational states of the information handling system corresponding to the diagnostic tests;
   receive a third indication specifying health condition severity of the information handling system, wherein the third indication is based on results of the health condition monitoring;
   receive a fourth indication specifying a user profile, wherein the fourth indication includes usage information for a user of the information handling system; and
   based on the first indication, the second indication, the third indication, and the fourth indication, generate a schedule for executing a first diagnostic test specified by the first indication; and
   execute the schedule, including instructions to:
      perform the first diagnostic test on the information handling system; and
      record the results of the first diagnostic test.

9. The article of manufacture of claim 8, wherein the schedule is for executing a plurality of diagnostic tests specified by the first indication, the plurality of diagnostic tests including the first diagnostic test.

10. The article of manufacture of claim 8, wherein the second indication includes operational states of the information handling system selected from at least one of:

an operating system executing on the information handling system;
a power source supplied to the information handling system;
a standby mode of the information handling system;
an audio output by the information handling system;
a screen display of the information handling system;
a network connection of the information handling system; and
user operation the information handling system.

11. The article of manufacture of claim 8, wherein the third indication specifies health condition severity of the information handling system selected from at least one of:
a high severity, indicating at least one of: imminent failure of the information handling system, a data loss from the information handling system, and a security breach of the information handling system;
a low severity, indicating at least one of: a spurious fault detected in the information handling system, an unconfirmed error detected in the information handling system, a first time error detected in the information handling system, and a low-impact error detected in the information handling system; and
an intermittent severity, indicating at least one of: an unconfirmed fault indicating further diagnostic tests, and a reboot error indicating a reboot of the information handling system.

12. The article of manufacture of claim 8, wherein the fourth indication includes usage information selected from at least one of:
a sleep/wake pattern for the user;
a power management setting for the information handling system;
a battery charging pattern for the information handling system;
a network usage pattern for the user; and
a docked state of the information handling system.

13. The article of manufacture of claim 8, wherein the schedule specifies when to execute the first diagnostic test according to at least one of:
immediate execution;
execution when the user operates the information handling system;
execution when the information handling system is idle;
execution upon reboot of the information handling system;
execution according to a service level agreement for the user; and
one-time execution; and
multiple-time execution.

14. An information handling system, comprising:
a processor subsystem having access to a memory, wherein the memory stores instructions that, when executed by the processor subsystem, cause the processor subsystem to:
receive a first indication specifying diagnostic tests to be performed on an information handling system, wherein the first indication is based on results of health condition monitoring of the information handling system;
receive a second indication specifying diagnostic test conditions respectively associated with the diagnostic tests specified by the first indication, wherein the second indication includes operational states of the information handling system corresponding to the diagnostic tests;
receive a third indication specifying health condition severity of the information handling system, wherein the third indication is based on results of the health condition monitoring;
receive a fourth indication specifying a user profile, wherein the fourth indication includes usage information for a user of the information handling system; and
based on the first indication, the second indication, the third indication, and the fourth indication, generate a schedule for executing a first diagnostic test specified by the first indication.

15. The information handling system of claim 14, further comprising instructions to:
execute the schedule, including instructions to:
perform the first diagnostic test on the information handling system; and
record the results of the first diagnostic test.

16. The information handling system of claim 14, wherein the schedule is for executing a plurality of diagnostic tests specified by the first indication, the plurality of diagnostic tests including the first diagnostic test.

17. The information handling system of claim 14, wherein the second indication includes operational states of the information handling system selected from at least one of:
an operating system executing on the information handling system;
a power source supplied to the information handling system;
a standby mode of the information handling system;
an audio output by the information handling system;
a screen display of the information handling system;
a network connection of the information handling system; and
user operation the information handling system.

18. The information handling system of claim 14, wherein the third indication specifies health condition severity of the information handling system selected from at least one of:
a high severity, indicating at least one of: imminent failure of the information handling system, a data loss from the information handling system, and a security breach of the information handling system;
a low severity, indicating at least one of: a spurious fault detected in the information handling system, an unconfirmed error detected in the information handling system, a first time error detected in the information handling system, and a low-impact error detected in the information handling system; and
an intermittent severity, indicating at least one of: an unconfirmed fault indicating further diagnostic tests, and a reboot error indicating a reboot of the information handling system.

19. The information handling system of claim 14, wherein the fourth indication includes usage information selected from at least one of:
a sleep/wake pattern for the user;
a power management setting for the information handling system;
a battery charging pattern for the information handling system;
a network usage pattern for the user; and
a docked state of the information handling system.

20. The information handling system of claim 14, wherein the schedule specifies when to execute the first diagnostic test according to at least one of:
immediate execution;
execution when the user operates the information handling system;
execution when the information handling system is idle;
execution upon reboot of the information handling system;
execution according to a service level agreement for the user; and
one-time execution; and
multiple-time execution.

* * * * *